(12) United States Patent
Greenfield

(10) Patent No.: US 11,027,515 B2
(45) Date of Patent: *Jun. 8, 2021

(54) SYSTEM AND METHOD FOR PRODUCING MULTI-LAYERED BOARD HAVING AT LEAST THREE MEDIUMS WITH AT LEAST TWO MEDIUMS BEING DIFFERENT

(71) Applicant: Scorrboard, LLC, Renton, WA (US)

(72) Inventor: Giles Greenfield, Renton, WA (US)

(73) Assignee: Scorrboard LLC, Tukwila, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/134,206

(22) Filed: Apr. 20, 2016

(65) Prior Publication Data
US 2017/0305103 A1 Oct. 26, 2017

(51) Int. Cl.
*B31F 1/28* (2006.01)
*B32B 3/28* (2006.01)
(Continued)

(52) U.S. Cl.
CPC .............. *B32B 3/28* (2013.01); *B31F 1/2813* (2013.01); *B31F 1/2895* (2013.01); *B32B 7/03* (2019.01);
(Continued)

(58) Field of Classification Search
CPC ...... B31F 1/32; B32B 3/28; Y10T 428/24694; Y10T 428/24702; Y10T 428/24711
See application file for complete search history.

(56) References Cited

U.S. PATENT DOCUMENTS 479,999 A 8/1892 Thompson
762,033 A 6/1904 Ferres
(Continued)

FOREIGN PATENT DOCUMENTS

AU 2014232272 10/2015
AU 2014265869 10/2015
(Continued)

OTHER PUBLICATIONS

U.S. Appl. No. 15/077,250, entitled System and Method for Inducing Fluting in a Paper Product by Embossing With Respect to Machine Direction, filed Mar. 22, 2016; 21 pages.
(Continued)

*Primary Examiner* — Donald J Loney
(74) *Attorney, Agent, or Firm* — FisherBroyles LLP; Kevin D. Jablonski

(57) ABSTRACT

A system and method for producing a board product characterized by having two corrugated mediums and at least one embossed medium in the board product. The board product may further include one or more facings that are adhesively coupled to either the corrugated medium, the embossed medium, or both. Generally speaking, a corrugated medium may be characterized as a paper product that exhibits flutes induced by a cross-corrugating process such that the induced flutes are perpendicular (or at least not congruent) with the machine direction of the paper product. An embossed medium may be characterized as a paper product that exhibits flutes induced by a linear-embossing process such that the induced flutes are aligned with the machine direction of the paper product. A resultant board product is stronger and more efficiently produced because of the linearly-embossed medium harnessing the natural strength of the paper in the machine direction.

12 Claims, 4 Drawing Sheets

(51) Int. Cl.
  *D21H 25/00*    (2006.01)
  *B32B 29/00*    (2006.01)
  *B32B 7/03*     (2019.01)
  *D21H 27/02*    (2006.01)
  *D21H 27/40*    (2006.01)
  *B32B 37/12*    (2006.01)
  *B32B 38/18*    (2006.01)

(52) U.S. Cl.
  CPC ......... *B32B 29/005* (2013.01); *D21H 5/0092* (2013.01); *D21H 25/005* (2013.01); *D21H 27/02* (2013.01); *D21H 27/40* (2013.01); *B32B 37/12* (2013.01); *B32B 38/1808* (2013.01); *B32B 2317/12* (2013.01); *Y10T 428/24694* (2015.01); *Y10T 428/24702* (2015.01); *Y10T 428/24711* (2015.01)

(56) References Cited

U.S. PATENT DOCUMENTS

| | | |
|---|---|---|
| 1,504,218 A | 8/1924 | Crowell |
| 1,582,841 A | 4/1926 | Lorenz |
| 1,620,367 A * | 3/1927 | Lion .................. H04R 1/22 181/167 |
| 1,692,720 A * | 11/1928 | Cannard ............... B31F 1/128 270/39.05 |
| 1,863,973 A | 6/1932 | Ellis, Jr. |
| 1,924,873 A | 8/1933 | Moone |
| 2,054,867 A | 9/1936 | Rudin et al. |
| 2,089,898 A * | 8/1937 | Kappler ............... B31F 1/2813 425/336 |
| RE20,970 E | 1/1939 | Rowe et al. |
| 2,359,314 A | 10/1944 | Klein et al. |
| 2,409,195 A | 10/1946 | Crawford |
| 2,474,381 A | 6/1949 | Bergstein |
| 2,485,020 A | 10/1949 | Staude |
| 2,503,874 A | 4/1950 | Ives |
| 2,651,448 A | 8/1950 | Dusseault |
| 2,547,880 A | 4/1951 | Meyer et al. |
| 2,576,278 A | 11/1951 | Bode |
| 2,758,047 A | 8/1956 | Dowd |
| 2,960,145 A | 11/1960 | Ruegenberg |
| 3,002,876 A * | 10/1961 | Rosati .................. B31F 1/225 193/35 R |
| 3,011,602 A | 12/1961 | Ensrud et al. |
| 3,039,372 A | 6/1962 | La Bombard |
| 3,122,300 A | 2/1964 | La Bombard |
| 3,156,599 A | 11/1964 | Ceesee |
| 3,178,494 A | 4/1965 | Tisdale |
| 3,290,205 A | 12/1966 | Goldstein et al. |
| 3,449,157 A | 6/1969 | Wandel |
| 3,526,566 A | 9/1970 | McIlvain, Jr. et al. |
| 3,529,516 A | 9/1970 | Dorsey et al. |
| 3,542,636 A | 11/1970 | Wandel |
| 3,735,674 A | 5/1973 | Haddock |
| 3,773,587 A | 11/1973 | Flewwelling |
| 4,034,135 A | 7/1977 | Passmore et al. |
| 4,126,508 A | 11/1978 | Hoelzinger |
| 4,140,564 A | 2/1979 | Schrader |
| 4,179,253 A | 12/1979 | Lightfoot |
| 4,259,950 A | 4/1981 | Klippel |
| 4,268,555 A | 5/1981 | Kantz |
| 4,285,764 A | 8/1981 | Salvai |
| 4,437,850 A | 3/1984 | Ono |
| 4,437,851 A | 3/1984 | Salenbo |
| 4,541,895 A | 9/1985 | Albert |
| 4,544,597 A | 10/1985 | Peer, Jr. et al. |
| 4,618,391 A | 10/1986 | Torti et al. |
| 4,657,611 A | 4/1987 | Guins |
| 46,934,134 | 9/1987 | McFarland et al. |
| 4,748,067 A | 5/1988 | Cline |
| 4,800,286 A | 1/1989 | Brears |
| 4,800,826 A | 1/1989 | Shiskin |
| 4,886,563 A | 12/1989 | Bennett et al. |
| 4,931,346 A | 6/1990 | Nogueras Dardina |
| 4,935,082 A | 6/1990 | Bennett et al. |
| 5,061,232 A | 10/1991 | Bloch et al. |
| 5,156,901 A | 10/1992 | Tanaka |
| 5,316,828 A | 5/1994 | Miller |
| 5,339,577 A | 8/1994 | Snyder |
| 5,356,364 A | 10/1994 | Veith et al. |
| 5,419,796 A | 5/1995 | Miller |
| 5,508,083 A * | 4/1996 | Chapman, Jr. .......... B31F 1/225 428/167 |
| 5,537,936 A | 7/1996 | Cordrey |
| 5,581,353 A | 12/1996 | Taylor |
| 5,582,571 A | 12/1996 | Simpson et al. |
| 5,589,257 A | 12/1996 | Carriker et al. |
| 5,630,903 A | 5/1997 | Knorr et al. |
| 5,687,517 A | 11/1997 | Wiercinski et al. |
| 5,690,601 A | 11/1997 | Cummings et al. |
| 5,733,403 A | 3/1998 | Morley |
| 5,799,861 A | 9/1998 | Bonner et al. |
| 5,857,395 A | 1/1999 | Bohm et al. |
| 5,944,016 A | 8/1999 | Ferko, III |
| 6,056,840 A | 5/2000 | Mills et al. |
| 6,139,938 A | 10/2000 | Lingle et al. |
| 6,143,113 A | 11/2000 | Berube |
| 6,153,037 A | 11/2000 | Kim et al. |
| 6,162,155 A | 12/2000 | Gordon et al. |
| 6,261,666 B1 | 7/2001 | Enderby et al. |
| D467,204 S | 12/2002 | Andresen |
| 6,508,751 B1 | 1/2003 | Weishew et al. |
| 6,800,052 B1 | 10/2004 | Abe |
| 6,836,331 B2 | 12/2004 | Reis et al. |
| 6,871,480 B1 | 3/2005 | Goodrich |
| 7,255,300 B2 | 8/2007 | Johnston |
| 7,413,629 B2 | 8/2008 | Fisher et al. |
| 7,909,954 B2 | 3/2011 | Johnston |
| 7,963,899 B2 | 6/2011 | Papsdorf et al. |
| 8,012,309 B2 | 9/2011 | Pare et al. |
| 8,771,579 B2 | 7/2014 | Kohler |
| 10,363,717 B2 | 7/2019 | Greenfield |
| 10,800,133 B2 * | 10/2020 | Greenfield |
| 2001/0001410 A1 | 5/2001 | Ishibuchi et al. |
| 2003/0137667 A1 | 7/2003 | Reis et al. |
| 2004/0076798 A1 | 4/2004 | Larsson et al. |
| 2004/0089412 A1 * | 5/2004 | Topolkaraev ....... B29C 47/0021 156/250 |
| 2004/0159693 A1 | 8/2004 | Adachi |
| 2004/0224828 A1 | 11/2004 | Nelles |
| 2005/0209075 A1 | 9/2005 | Kocherga et al. |
| 2006/0151655 A1 | 7/2006 | Johnston |
| 2006/0246261 A1 | 11/2006 | Kasabo et al. |
| 2007/0098887 A1 | 5/2007 | Kohler |
| 2008/0300825 A1 | 12/2008 | Ishibuchi et al. |
| 2009/0029840 A1 | 1/2009 | Chen |
| 2009/0117376 A1 | 5/2009 | Bloembergen et al. |
| 2010/0028611 A1 | 2/2010 | Adie |
| 2010/0080941 A1 | 4/2010 | McCarville et al. |
| 2010/0331160 A1 | 12/2010 | Kohler |
| 2011/0014433 A1 | 1/2011 | Trani et al. |
| 2011/0114712 A1 | 5/2011 | Malo et al. |
| 2011/0177298 A1 | 7/2011 | Gardiner |
| 2011/0226847 A1 | 9/2011 | Nakano |
| 2012/0205429 A1 | 8/2012 | Trani et al. |
| 2012/0226250 A1 | 9/2012 | Sato et al. |
| 2012/0276341 A1 | 11/2012 | Lake et al. |
| 2013/0139837 A1 | 6/2013 | Kaljura et al. |
| 2014/0044923 A1 | 2/2014 | Gelli |
| 2014/0141113 A1 | 5/2014 | Kohler |
| 2014/0166520 A1 | 6/2014 | Hoppe et al. |
| 2015/0010734 A1 | 1/2015 | Van Berlo |
| 2015/0114249 A1 | 4/2015 | Comorre |
| 2015/0307755 A1 | 10/2015 | Krumm et al. |
| 2016/0167338 A1 | 6/2016 | Greenfield |
| 2016/0271897 A1 | 9/2016 | Greenfield |
| 2017/0157894 A9 | 6/2017 | Greenfield |

(56) References Cited

U.S. PATENT DOCUMENTS

| | | | |
|---|---|---|---|
| 2017/0341331 | A1 | 11/2017 | Greenfield |
| 2019/0232600 | A1 | 8/2019 | Greenfield |

FOREIGN PATENT DOCUMENTS

| | | | |
|---|---|---|---|
| CA | 2907431 | | 9/2014 |
| CA | 2907392 | | 11/2014 |
| CL | 1997000270 | A | 10/1997 |
| CL | 2004000310 | A | 3/2005 |
| CL | 2012002694 | A | 3/2013 |
| CL | 2014000247 | | 1/2014 |
| CL | 56755 | | 3/2014 |
| CL | 2013002596 | A | 4/2014 |
| CL | 2014003401 | A | 4/2015 |
| CL | 2015002781 | | 9/2015 |
| CL | 2018002987 | A1 | 2/2019 |
| CL | 2018002988 | A1 | 2/2019 |
| CL | 2018002989 | A1 | 2/2019 |
| CL | 2018002990 | A1 | 2/2019 |
| CN | 1092355 | A | 9/1994 |
| CN | 1126457 | | 7/1996 |
| CN | 1148360 | A | 4/1997 |
| CN | 1150403 | A | 5/1997 |
| CN | 1469802 | A | 1/2004 |
| CN | 2806125 | Y | 8/2006 |
| CN | 2841324 | | 11/2006 |
| CN | 101259765 | A | 9/2008 |
| CN | 101772457 | A | 7/2010 |
| CN | 101952120 | | 1/2011 |
| CN | 102105300 | A | 6/2011 |
| CN | 102470624 | A | 5/2012 |
| CN | 202986283 | U | 6/2013 |
| CN | 104494211 | A | 4/2015 |
| CN | 105121147 | | 12/2015 |
| CN | 105121148 | | 12/2015 |
| EP | 1110709 | A2 | 6/2001 |
| EP | 2969522 | | 1/2016 |
| EP | 2969526 | | 1/2016 |
| EP | 3436649 | A1 | 2/2019 |
| EP | 3445583 | A4 | 2/2019 |
| FR | 2596033 | A1 | 3/1986 |
| FR | 2594160 | A3 | 8/1987 |
| GB | 594328 | A | 11/1947 |
| GB | 977069 | A | 12/1961 |
| GB | 1542765 | | 3/1979 |
| GB | 2144077 | A | 2/1985 |
| GB | 2258189 | A | 2/1993 |
| GB | 2301316 | A | 5/1995 |
| GB | 2368074 | A | 4/2002 |
| HK | 1212298 | | 6/2016 |
| HK | 1212302 | | 6/2016 |
| JP | S4972089 | U | 7/1974 |
| JP | 50-10195 | U | 4/1975 |
| JP | S51-115191 | A | 10/1976 |
| JP | S52-156090 | A | 12/1977 |
| JP | 62-116133 | | 5/1987 |
| JP | H02-63358 | A | 3/1990 |
| JP | 02-235623 | A | 9/1990 |
| JP | H03-106031 | | 1/1991 |
| JP | H03-26534 | A | 2/1991 |
| JP | 03-275292 | A | 12/1991 |
| JP | 1996-309889 | A | 11/1996 |
| JP | H09-39119 | A | 2/1997 |
| JP | H0948077 | A | 2/1997 |
| JP | H10-50775 | A | 2/1998 |
| JP | 2003291230 | A | 6/2001 |
| JP | 2005509545 | A | 4/2005 |
| JP | 2007152689 | A | 6/2007 |
| JP | 2009125998 | A | 6/2009 |
| JP | 2009172942 | A | 8/2009 |
| JP | 2011/079207 | A | 4/2011 |
| JP | 2011079207 | A | 4/2011 |
| JP | 2013-523492 | | 6/2013 |
| JP | 2016-519008 | | 6/2016 |
| JP | 2016515959 | | 6/2016 |
| JP | 2019514726 | A | 6/2019 |
| KR | 2000-0058870 | | 10/2000 |
| KR | 2000/0058870 | A | 10/2000 |
| KR | 1008/66390 | B1 | 11/2008 |
| KR | 100866390 | B1 | 11/2008 |
| KR | 20110104772 | A | 9/2011 |
| KR | 20160008170 | | 1/2016 |
| KR | 20160008518 | | 1/2016 |
| PH | 12015502380 | | 2/2016 |
| PH | 12015502381 | | 2/2016 |
| WO | 93/23241 | A1 | 11/1993 |
| WO | 9427813 | A1 | 12/1994 |
| WO | WO 95/35204 | A1 | 12/1995 |
| WO | 98/18614 | | 5/1998 |
| WO | 1999047347 | | 9/1999 |
| WO | 01/58679 | A1 | 8/2001 |
| WO | 2004052635 | A1 | 6/2004 |
| WO | 2009/101526 | A1 | 8/2009 |
| WO | 2012128604 | | 9/2012 |
| WO | 2013/019126 | A1 | 2/2013 |
| WO | WO 2013/098353 | A1 | 7/2013 |
| WO | 2014146036 | | 9/2014 |
| WO | 2014186043 | | 11/2014 |
| WO | WO 2015/128546 | A1 | 9/2015 |
| WO | 2015178766 | A1 | 11/2015 |
| WO | 2017184447 | A1 | 10/2017 |

OTHER PUBLICATIONS

U.S. Appl. No. 15/088,999, entitled System and Method for Producing Multi-Board Having a Corrugated Medium and an Embossed Medium, filed Apr. 1, 2016; 22 pages.
First Examination Report for New Zealand Patent Application Serial No. 712616, New Zealand Intellectual Property Office, dated Nov. 30, 2015, pp. 2.
First Examination Report for New Zealand Patent Application Serial No. 712611, New Zealand Intellectual Property Office, dated Nov. 30, 2015, pp. 2.
International Search Report based on PCT/US2014/030916; dated Aug. 22, 2014, pp. 3.
International Search Report based on PCT/US2014/030909; dated Aug. 20, 2014, pp. 3.
First Patent Examination Report for Australian Patent Application Serial No. 2014232272, Australian Government, IP Australia, dated Mar. 3, 2016, pp. 3.
First Patent Examination Report for Australian Patent Application Serial No. 2014265869, Australian Government, IP Australia, Apr. 21, 2016, pp. 2.
Second Examination Report for New Zealand Patent Application Serial No. 712611, New Zealand Intellectual Property Office, Jul. 6, 2016, pp. 3.
Internation Search Report & Written Opinion, dated Jul. 21, 2017; PCT/US2017/025531, filed Mar. 31, 2017.
International Search Report and Written Opinion dated Jul. 6, 2017; PCT Appl. US2017/25491, filed Mar. 31, 2017.
International Search Report & Written Opinion dated Jun. 15, 2017; PCT Appl. No. US17/23611 filed Mar. 22, 2017.
International Search Report & WrittenOpinion dated Jun. 27, 2017; PCT Appl. No. US17/25510; filed Mar. 31, 2017 I.
International Search Report & Written Opinion dated Jun. 30, 2017; PCT Appl. No. US17/027624; filed Apr. 14, 2017.
Supplementary European Search Report for European application No. EP14762807, European Patent Office, The Hague, dated Jun. 21, 2016, pp. 5.
First Office Action and Search Report along with English Translation for Chinese Application No. 201480016009X, dated Aug. 3, 2016, pp. 17.
European Patent Office; Extended European Search Report dated Nov. 27, 2019; EPO Application No. 17786318.0; pp. 1-8.
European Patent Office; Extended European Search Report dated Nov. 28, 2019; EPO Application No. 17776824.9; pp. 1-7.
European Patent Office; Extended European Search Report dated Nov. 21, 2019; EPO Application No. 17786382.6; pp. 1-8.

(56) References Cited

OTHER PUBLICATIONS

European Patent Office; Extended European Search Report dated Nov. 21, 2019; EPO Application No. 17786317.2; pp. 1-7.
European Patent Office; Extended European Search Report dated Nov. 7, 2019; EPO Application No. 17786383.4; pp. 1-7.
European Patent Office; Extended European Search Report dated Jul. 15, 2019; EP Application No. 17771068.8; pp. 1-6.
EMS Innovations Inc., "Adult Dispos-A-Board", published on Youtube.com on Mar. 2, 2012, retrieved from URL https://www.youtube.com/watch?v=Ses-wKU5ht4 on Apr. 29, 2020 (Year: 2012).
WO dated Aug. 20, 2009 for PCT/IB2009/000271 filed Feb. 13, 2009.
European Extended Search Report; European Patent Organization; EP 14797031.3; dated Oct. 31, 2016; pp. 1-8.

* cited by examiner

# SYSTEM AND METHOD FOR PRODUCING MULTI-LAYERED BOARD HAVING AT LEAST THREE MEDIUMS WITH AT LEAST TWO MEDIUMS BEING DIFFERENT

CROSS-RELATED APPLICATIONS

This application is related to U.S. patent application Ser. No. 15/077,250, entitled SYSTEM AND METHOD FOR INDUCING FLUTING IN A PAPER PRODUCT BY EMBOSSING WITH RESPECT TO MACHINE DIRECTION, filed 22 Mar. 2016, and is related to U.S. patent application Ser. No. 15/088,999, entitled SYSTEM AND METHOD FOR PRODUCING MULTI-LAYERED BOARD HAVING A CORRUGATED MEDIUM AND AN EMBOSSED MEDIUM, filed 1 Apr. 2016, further, the present application is also related to U.S. patent application Ser. No. 15/134,106, entitled SYSTEM AND METHOD FOR PRODUCING A MULTI-LAYERED BOARD HAVING A MEDIUM WITH IMPROVED STRUCTURE filed 20 Apr. 2016 (now U.S. Pat. No. 10,328,654), and is related to U.S. patent application Ser. No. 15/134,153 entitled SYSTEM AND METHOD FOR PRODUCING A FACING FOR A BOARD PRODUCT WITH STRATEGICALLY PLACED SCORES filed 20 Apr. 2016 (now U.S. Pat. No. 10,800,133); and is related to U.S. patent application Ser. No. 15/134,176 entitled SYSTEM AND METHOD FOR PRODUCING AN ARTICULATING BOARD PRODUCT HAVING A FACING WITH SCORE LINES IN REGISTER TO FLUTING filed 20 Apr. 2016, all of the foregoing applications are incorporated hereby reference in their entireties.

BACKGROUND

Modern paper-making techniques use paper machines at paper mills to produce rolls of paper that, in turn, can be used by board makers to produce board products (i.e., corrugated board). As a result, rolls of paper may be produced from machines that operate continuously. Modern paper machines typically produce paper from a number of substances including wood pulp that comprise wood fibers (although other fibers may also be used). These fibers tend to be elongated and suitable to be aligned next to one another. The fiber starts as a slurry that can be fed onto a moving screen from a head box of the paper machine. In modern paper machines, the fibers tend to align with each other and align with a direction in which the screen is moving. This alignment direction of underlying fibers is called the major direction of the paper and is in line with the machine direction. Thus, the major direction is often simply called the machine direction (MD) and the paper that is produced has an associated MD value.

When paper is used to make a board product, portions or layers of the board product may be corrugated. Traditional corrugating machines will corrugate the underlying paper product in the cross direction (CD) of the paper thereby failing to take advantage of the natural strength bias of the paper in the machine direction. Further, the greater natural strength qualities of paper in the machine direction are left unharnessed by cross corrugation techniques in board making solutions. As a result, companies that produce conventional board products remain entrenched in old production processes that limit the strength of the board product.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
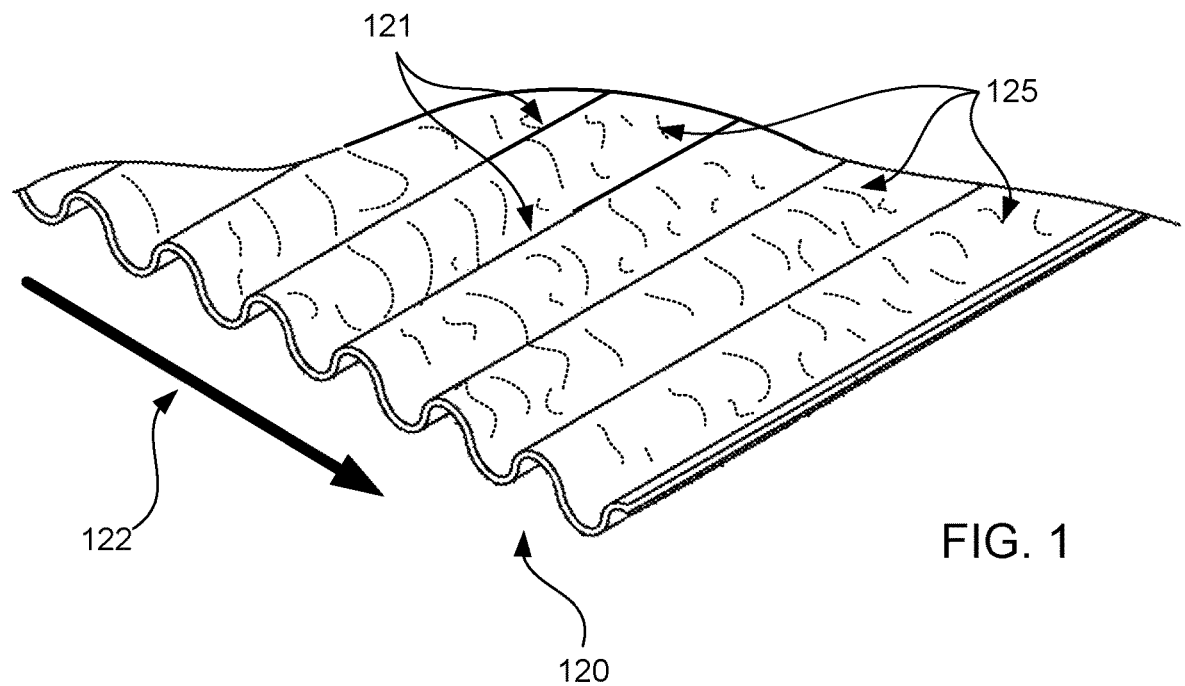
FIG. 1 is an isometric cutaway view of a corrugated medium that may be part of one or more board products according to one or more an embodiment of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for producing a board product made from paper products that have two corrugated mediums (sometimes called corrugated fluting) and at least one embossed medium (sometimes called embossed fluting). Because of these three mediums, this board product may sometimes be called a Triple Wall™ board. The board product may further include one or more facings (sometimes called liners or walls) that are adhesively coupled to the corrugated medium, the embossed medium, or both. Generally speaking, a corrugated medium may be characterized as a paper product that exhibits flutes induced by a corrugating process such that the induced flutes are perpendicular (or at least not congruent) with the machine direction of the paper product. That is, the corrugated medium has flutes in the cross direction of the paper. An embossed medium may be characterized as a paper product that exhibits flutes induced by an embossing process such that the induced flutes are aligned with the machine direction of the paper product.

When a board product is produced such that a corrugated medium and an embossed medium are adhesively coupled and flanked by a facing on either outside surface, the resultant characteristics of the board product is superior to conventional board product that use only corrugated medium. This is because the embossed medium is produced using a linear embossing process that takes advantage of the natural strength of the machine direction of the paper product. Additional permutations of the underlying concept of having a cross-corrugated medium and a linearly embossed medium in the same board product are possible, including disposing a facing between the corrugated medium and the embossed medium and having facings on one or both outer walls of the board product. These advantages and additional aspects of various embodiments of the subject matter disclosed herein are discussed below with respect to FIGS. 1-5.

Prior to discussing the various embodiments, a brief discussion about cross corrugating and linear embossing is presented. As has been briefly stated above, conventional board products include a conventionally produced corrugated medium, e.g., a cross-corrugated medium. A cross-corrugated medium has flutes formed perpendicular to most underlying fibers of the paper product. This results in flutes that are not aligned with the majority of underlying fibers and, therefore, do not take advantage of the natural strength of the MD value of the paper (when compared to the CD value). Such a failure to harness the MD value of the paper leads to loss of opportunity in the manufacturing of board products when specific board strength is to be realized. That is, it will necessarily take more paper (heavier paper, larger flutes, and the like) to realize the required board strength.

Embossing is a process that stretches and deforms the paper going through the embossing rolls. As the paper is squeezed through an embossing roll that is closely aligned with a counterpart embossing roll, the paper tends to stretch away from the contact points between the embossing rolls and. The resultant embossed paper now has a width that is greater due to the stretching of the paper in the lateral direction. But, the embossed paper now includes fluting such the original width of the pre-embossed paper is almost equivalent to the width of the resultant fluted medium. Further, the length of the paper (as defined by the machine direction of the paper) also remains unaffected by the embossing process.

A linearly-embossed medium is different from a cross-corrugated medium in that the induced flutes are aligned with the MD value of the paper product. This results in flutes that are aligned with the majority of underlying fibers and, therefore, take full advantage of the natural strength of the MD value of the paper (when compared to the CD value). Harnessing the MD value of the paper leads to efficiencies in the manufacturing of board products when specific board strength is to be realized. That is, it will necessarily take less paper (lighter paper, smaller flutes, and the like) to realize the required board strength. Aspects of making, producing, and using linearly embossed mediums are discussed in greater detail in U.S. patent application Ser. No. 15/077,250 entitled "SYSTEM AND METHOD FOR INDUCING FLUTING IN A PAPER PRODUCT BY EMBOSSING WITH RESPECT TO MACHINE DIRECTION" and filed on Mar. 22, 2016, which is incorporated herein by reference in its entirety and for all purposes. Thus, the aspects of linearly-embossed mediums will not be discussed further for brevity as the discussion now turns to FIGS. 1-5.

FIG. 1 is an isometric cutaway view of a corrugated medium 120 that may be part of one or more board products according to one or more embodiments of the subject matter disclosed herein. This diagram shows an isometric view of a portion of a corrugated medium 120 that may be formed from a corrugating process as may be conventionally known. That is, flutes 121 are formed by passing the initial paper product through corrugating rolls in a cross-corrugation technique such that the flutes 121 are formed to be perpendicular (e.g., not congruent) with the majority of underlying fibers 125 of the paper product and are not congruent with the machine direction 122. As has been briefly discussed above, a cross-corrugated medium 120 does not harness the natural strength of the paper product in the machine direction as the flutes 121 are formed in the cross direction of the paper (e.g., incongruent with the majority of the underlying fibers 125).

Notwithstanding its failure to harness the natural strength of the paper in the machine direction 122, the cross-corrugated medium 120 of FIG. 1 is relatively inexpensive to produce and is widely produced by readily available industrial corrugating machines. Such a corrugated medium 120 may be one component/layer of a board product as discussed below with respect to FIG. 3.

Embossing is a process that stretches and deforms the paper going through the embossing rolls. As the paper is squeezed through an embossing roll that is closely aligned with a counterpart embossing roll, the paper tends to stretch away from the contact points between the embossing rolls and. The resultant embossed paper now has a width that is greater due to the stretching of the paper in the lateral direction. But, the embossed paper now includes fluting such the original width of the pre-embossed paper is almost equivalent to the width of the resultant fluted medium. Further, the length of the paper (as defined by the machine direction of the paper) also remains unaffected by the embossing process.

The embossing process results in almost no take-up factor, and in some applications, zero take-up factor. This is because the flutes are not simply formed around corrugating ribs, but are actually stretched to result in a desired pattern. The embossed pattern then yields a fluted pattern similar to corrugating. Therefore, inducing fluting through embossing leads to a large increase in efficiency (e.g., reduction in take-up factor by as much as 43% in the case of a C-flute profile) while also taking advantage of the MD value of the paper that makes up the fluted medium.

Figure 2:
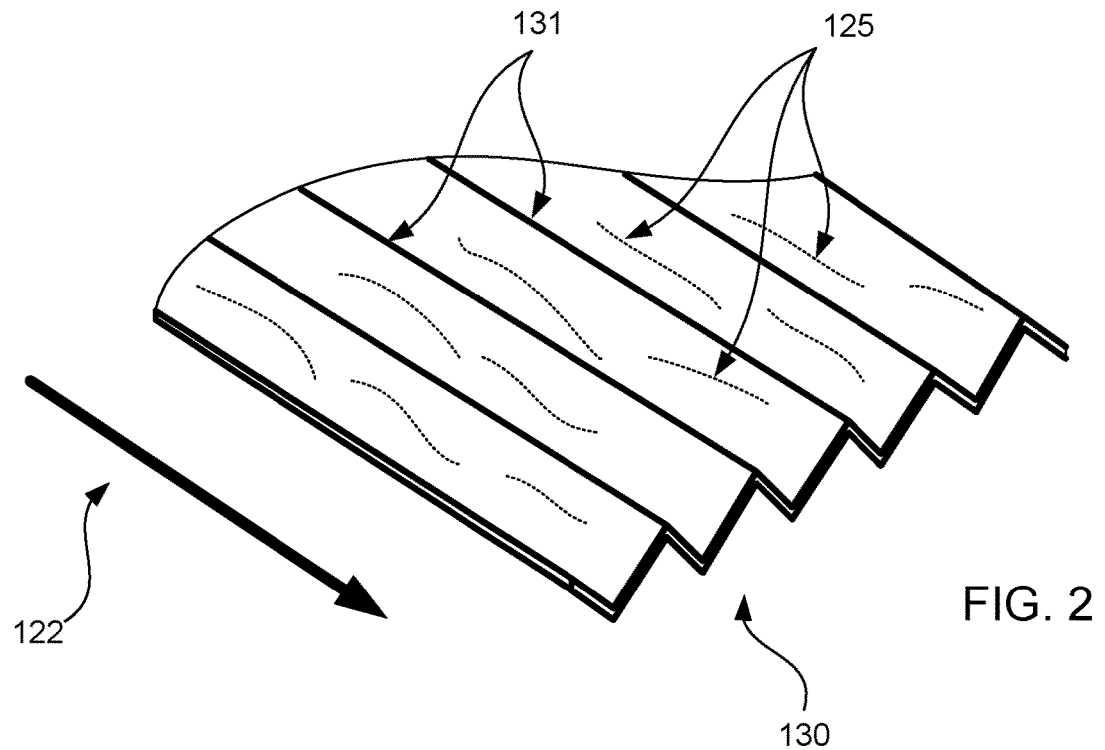
FIG. 2 is an isometric cutaway view of an embossed medium that may be part of one or more board products according to one or more embodiments of the subject matter disclosed herein.

FIG. 2 is an isometric cutaway view of an embossed medium 130 that may be part of one or more board products according to one or more embodiments of the subject matter disclosed herein. This diagram shows an isometric view of a portion of an embossed medium 130 that may be formed from an embossing process. That is, flutes 131 are formed from passing the initial paper product through embossing rolls to form flutes using a linear-embossing technique such that the flutes 131 are formed congruent with a majority of underlying fibers 125 of the paper. The flutes 131 are also formed congruent with the machine direction 122. A linearly-embossed medium 130 harnesses the natural strength of the paper in the machine direction 122 as the flutes 131 are formed in the machine direction 122 of the paper (e.g., congruent with a majority the underlying fibers 125). Therefore, a linearly-embossed medium 130 does harness the natural strength of the paper in the machine direction 122. Such an embossed medium 130 may be another component/layer of a board product as discussed below with respect to FIG. 3.

Figure 3:
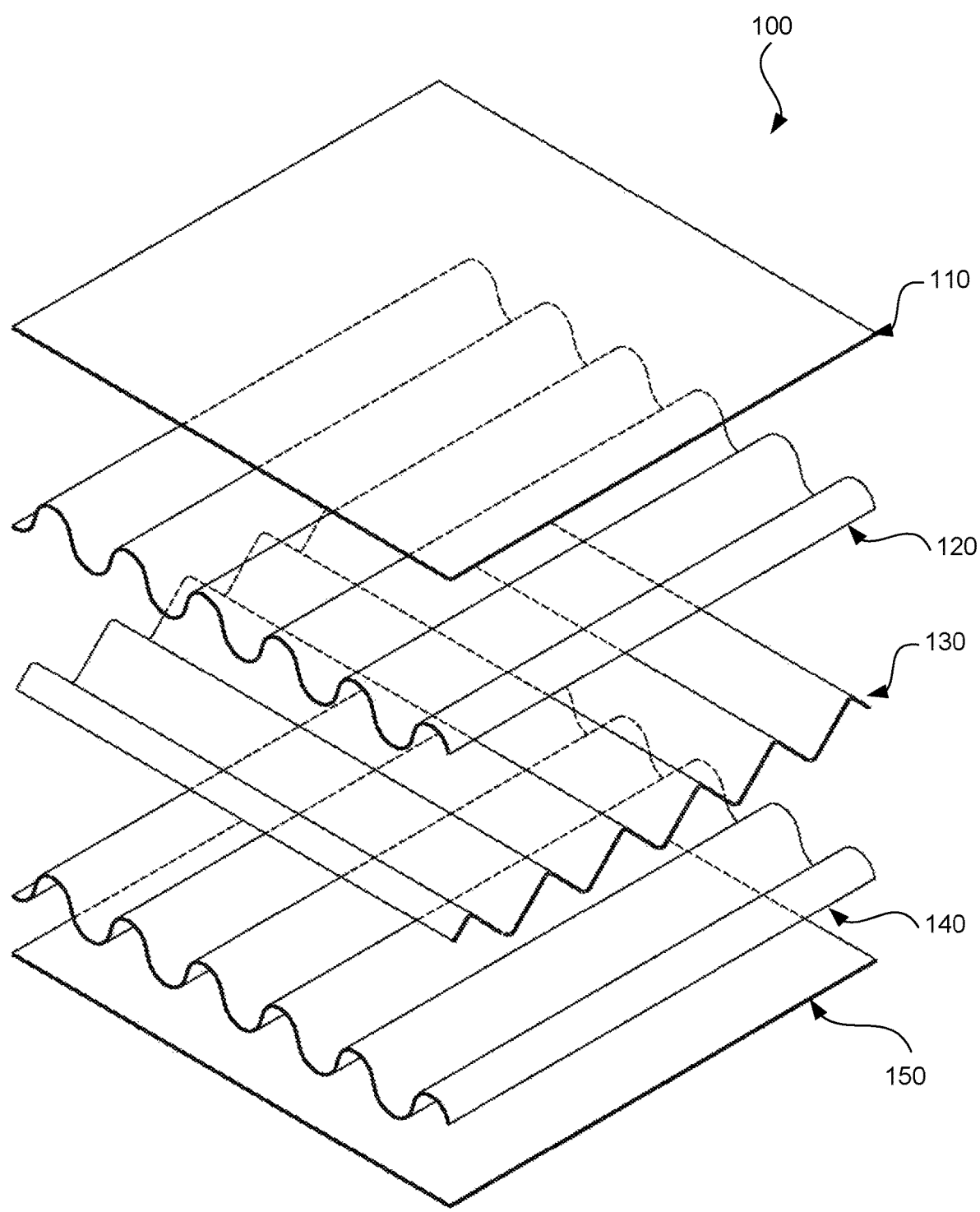
FIG. 3 is an exploded isometric cutaway view of a board product having two corrugated mediums and at least one embossed medium according to an embodiment of the subject matter disclosed herein.

FIG. 3 is an exploded isometric cutaway view of a board product 100 having two corrugated mediums 120 and 140 and at least one embossed medium 130 according to an embodiment of the subject matter disclosed herein. In this embodiment, the board product 100 includes five layers: a first facing 110, a first corrugated medium 120, an embossed medium 130, a second corrugated medium 140, and a second facing 150. As is shown, the first facing 110 may form a top-side outer wall (although the top/bottom direction reference to alignment of the board product 100 is arbitrary) that is coupled to one side of the first corrugated medium 120. The coupling may be through an adhesive applied to the apex of each flute on the top-side of the first corrugated medium 120 such that the first facing 110 is glued to the first corrugated medium 120 where adhesive is applied. In other embodiments, glue may be applied to the entirety of the facing 110 prior to being coupled to the first corrugated medium 120.

Likewise, a second facing 150 may form a bottom-side outer wall (again, the top/bottom direction reference is arbitrary) that is coupled to one side of the second corrugated medium 140. The coupling may be through an adhesive applied to the apex of each flute on the bottom-side of the second corrugated medium 140 such that the second facing 150 is glued to the second corrugated medium 140 where adhesive is applied. In other embodiments, glue may be applied to the entirety of the second facing 150 prior to being coupled to the second corrugated medium 140.

Further, the first corrugated medium 120 and the embossed medium 130 may be glued to each other using adhesive. Because the flutes of the first corrugated medium 120 are aligned in the cross direction and the flutes of the embossed medium 130 are aligned in the machine direction, the contact points between these two mediums will be at the crossings of the apexes of the respective flutes. In this manner, the first corrugated medium 120 and the embossed medium 130 are affixed with respect to one another because of the adhesive holding one medium directly to the other. Similarly, the second corrugated medium 140 and the embossed medium 130 may also be glued to each other using adhesive. The flutes of the second corrugated medium 140 are aligned in the cross direction as well and the contact points between these two mediums will be at the crossings of the apexes of the respective flutes. In this manner, the second corrugated medium 140 and the embossed medium 130 are affixed with respect to one another because of the adhesive holding one medium directly to the other.

When all three mediums are assembled and affixed, the resultant board product 100 is stronger than conventional board product because the linearly embossed medium 130 takes advantage of the superior MD value of the underlying paper product. Further, the three mediums may be flanked by first and second facings 110 and 150. As can also be seen in FIG. 4, the five layers, when assembled feature the embossed medium 130 having flutes that are perpendicular (or at least not congruent) with the flutes of the first and second corrugated mediums 120 and 140. This results in additional board strength because the flutes of the respective mediums are perpendicular with respect to each other (or at the least, not congruent). Other embodiments not shown may include any combination of three mediums and facings such that at least one medium is a corrugated medium 120 or 140 and at least one medium is an embossed medium 130.

In the embodiment shown in FIG. 3, the corrugated mediums 120 and 140 are shown with a flute profile known as C-flute. The flute profile is a standardized set of parameters detailing various measurements of the flute, such as flute height, flute pitch, number of flutes per lineal foot, and the like. Other standardized flute profiles include A-flute, B-flute, E-flute, F-flute, and R-flute. Thus, in this embodiment, the corrugated mediums 120 and 140 includes a sinusoidal C-flute pattern. Further, the embossed medium 130 is also shown with a C-flute profile, but, of course, the flutes are linear with respect to the machine direction of the underlying paper. The embossed medium 130 also may have a different shape in that the flute profile is characterized by a triangular pattern. In other embodiments not shown, the embossed medium 130 may have a different flute profile than the corrugated medium 120, such as E-flute profile.

Figure 4:
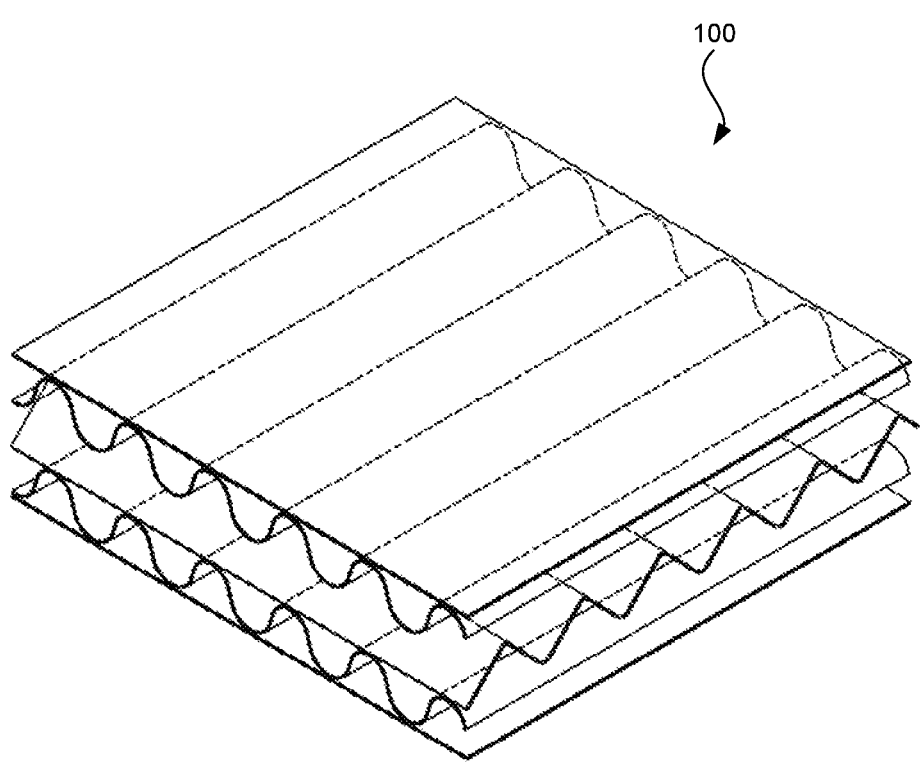
FIG. 4 is an isometric cutaway view of a board product having two corrugated mediums and at least one embossed medium according to an embodiment of the subject matter disclosed herein.

FIG. 4 is an isometric cutaway view of a board product 100 having two corrugated mediums and at least one embossed medium according to an embodiment of the subject matter disclosed herein. This view shows the exploded view board product 100 of FIG. 3 in an assembled form.

As has been discussed with respect to FIGS. 3 and 4, the induced flutes of the embossed medium 130 are congruent with the machine direction 122. Thus, the underlying long fibers 125 (FIG. 2) of the paper remain aligned with the flute direction. Having the underlying long fibers 125 (FIG. 2) aligned with respective flutes results in an alignment of the flutes with the greater MD value of the paper (when compared to the CD value). Cross-corrugating techniques necessarily lead to having flutes aligned with the CD value of the paper. Differently, the linear embossing process takes advantage of the MD value of the paper by aligning the flutes in the machine direction. Therefore, the flute-inducing embossing process allows less total fiber to be used in achieving a specific strength of a resulting board product, such as board product 100.

Such a board product having a linearly-embossed medium 130 further leads to efficiencies on several levels and succeeds in realigning the interests of paper makers and board/box makers. First, linear embossing allows the paper maker to disregard any need to carefully control the alignment (or rather non-alignment) of the pulp fibers when first poured onto a screen on a paper machine. Paper makers, in order to improve strength in the cross direction, may employ paper machines that include a head box that combats the natural alignment of underlying long fibers in the machine direction. With linear embossing, the need for improved strength in the cross direction is reduced or eliminated. Therefore, the paper-maker can focus on improving the speed of the paper machine.

Second, board makers can produce board products with less paper material. The linearly embossed layer 130 discussed herein lead to a fluted medium that requires less material for production. That is, in conventional corrugating machines, the paper needed for the fluted medium is greater than the paper needed for a facing portion (in linear terms). Thus, the efficiency gain is two-fold: less overall paper used in making corrugated board and greater strength in the resultant board by aligning the MD value in both flutes and facings.

The embodiments as discussed with respect to FIGS. 1-4 have two corrugated mediums 120 and 140 that exhibit a sinusoidal shape of a flute. Further, the embossed medium 130 is shown as having a triangular flute profile. However, other embodiments may include different shapes for flutes of either medium including saw-tooth, trapezoidal, or any manner of a curvilinear shape. Additional aspects of the board product 100 of FIGS. 1-4 are discussed next with respect to the machine of FIG. 5.

Figure 5:
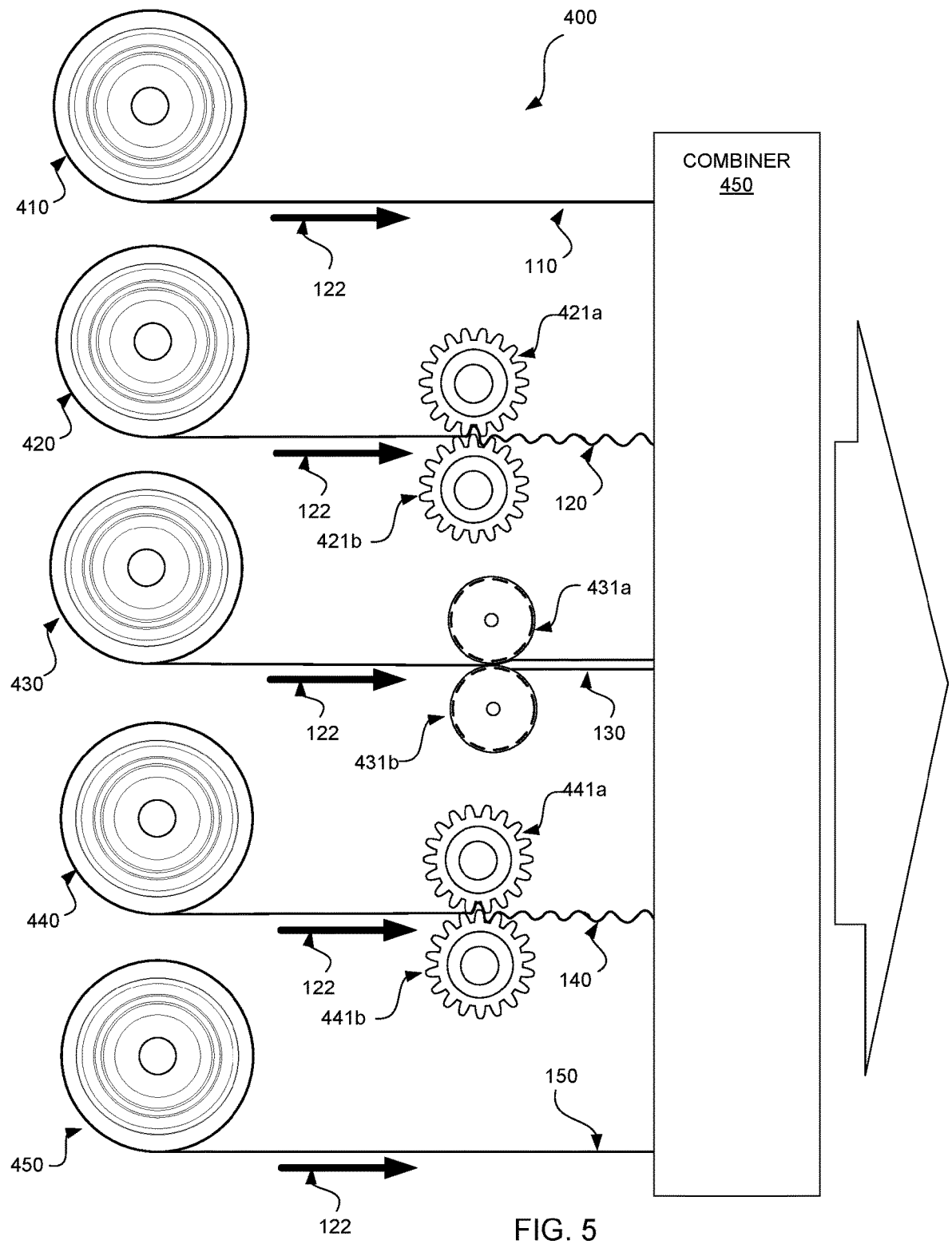
FIG. 5 is a diagram of aspects of a machine configured to produce the board product of FIGS. 3 and 4 according to an embodiment of the subject matter disclosed herein.

FIG. 5 is a diagram of aspects of a machine 400 configured to produce the board product 100 (or other board products) of FIGS. 3 and 4 according to an embodiment of the subject matter disclosed herein. In this embodiment, the machine includes five feed rolls 410, 420, 430, 440, and 450 of paper that are used to produce a board product. These feed rolls include a first facing feed roll 410, a first corrugated medium feed roll 420, an embossed medium feed roll 430, a second corrugated medium feed roll 440, and a second facing feed roll 450. Note that the paper that is wound on the corrugated medium feed rolls 420 and 440 is prior to corrugating and the paper that is wound on the embossed medium feed roll 430 is prior to embossing. The weights and composition of the paper for each respective feed roll may be different and designed specifically for the respective purpose.

The paper from each roll may be unwound from each respective roll and fed toward a combiner 450 that is configured to combine the various layers of paper together to form a resultant board product. In various embodiments, the combination of feed rolls in the machine 400 may be different from what is shown in FIG. 5. For example, the configuration of feed rolls as shown in FIG. 5 may produce a board product with additional layers. Such additional layers may be one or more additional liners between mediums such that a board product with six or seven layers may be produced. Additional layers in a board product may be well understood by a skilled artisan so the remainder of the discussion with regard to FIG. 5 focuses on the embodiment of the board product of FIGS. 3 and 4.

Prior to entering the combiner 450, at least some of the paper from the feed rolls may be passed through a stage for forming the paper into a medium. As used herein and in the industry, a medium may refer to a paper product that has been formed into paper having flutes. Thus, the first corrugated medium feed roll 420 may feed paper into first and second corrugating rolls 421a and 421b that are aligned with respect to each other. As the paper exits the first corrugating stage (e.g., corrugating rolls 421a and 421b), it becomes the first corrugated medium 120 as discussed above with respect to FIG. 1. The first corrugated medium 120 is then fed into the combiner 450 to be combined with other materials. Likewise, the second corrugated medium feed roll 440 may feed paper into third and fourth corrugating rolls 441a and 441b that are aligned with respect to each other. As the paper exits the second corrugating stage (e.g., corrugating rolls 441a and 441b), it becomes the second corrugated medium 140. The second corrugated medium 140 is then fed into the combiner 450 to be combined with other materials.

Similarly, the embossed medium feed roll 430 may feed paper into first and second embossing rolls 431a and 431b that are aligned with respect to each other. As the paper exits the embossing stage (e.g., embossing rolls 431a and 431b), it becomes the embossed medium 130 as discussed above with respect to FIG. 2. The embossed medium 130 is then fed into the combiner 450 to be combined with other materials.

In the embodiment that produces the board product of FIG. 3, a first facing 110, the first corrugated medium 120, the embossed medium 130, the second corrugated medium 140, and a second facing 150 are combined in the combiner 450 using various techniques such as adhesion, curing, wetting, drying, heating, and chemical treatment. The resultant board product 100 features two cross-corrugated mediums 120 and 140 and at least one linearly-embossed medium 130.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A board product, comprising:
    a first medium formed from a first paper having a machine direction and cross direction, the first medium having stretched fibers aligned in the machine direction and having one or more score lines having axes aligned with the machine direction of the first medium, wherein a width of the first medium in the cross direction after inducement of the score lines is equivalent to a width of the first medium in the cross direction before inducement of the score lines;
    a second medium formed from a second paper having a machine direction and a cross direction, the second medium affixed with respect to the first medium and having one or more flutes aligned with the cross direction of the second paper; and
    a third medium affixed to the first medium.

2. The board product of claim 1, further comprising a facing adhered to the first medium.

3. The board product of claim 1, further comprising a facing adhered to the second medium.

4. The board product of claim 1, wherein the first medium is adhered directly to the second medium.

5. The board product of claim 1, further comprising a facing adhered to the first medium and adhered to the second medium such that the facing is affixed between the first medium and the second medium.

6. The board product of claim 1, wherein the first medium further comprises flutes induced through embossing.

7. The board product of claim 1, wherein the second medium further comprises flutes induced through corrugating.

8. The board product of claim 1, wherein the third medium is formed from a third paper having a machine direction and a cross direction, the third medium affixed with respect to the first medium and having one or more flutes aligned with the cross direction of the third paper, wherein the third medium further comprises flutes induced through corrugating.

9. The board product of claim 1, wherein the first medium further comprises flutes having a size corresponding to an E-flute profile.

10. The board product of claim 1, wherein the second medium further comprises flutes having a size corresponding to a C-flute profile.

11. The board product of claim 1, wherein the score lines in the first medium are not congruent with the flutes in the second medium.

12. The board product of claim 1, wherein the stretched fibers of the first medium comprise regions of concentrated fibers in the machine direction such that the score lines are aligned equidistantly away from the stretched fiber concentration regions.

* * * * *